O. DEMPEWOLF.
BLANK FEED MECHANISM FOR CAN CLOSING MACHINES.
APPLICATION FILED OCT. 1, 1908.
913,628.
Patented Feb. 23, 1909.
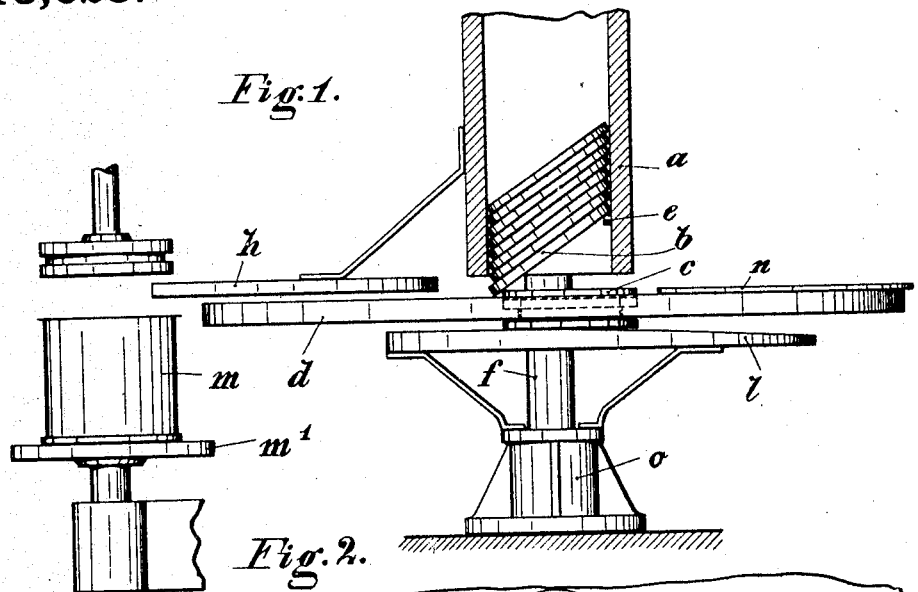
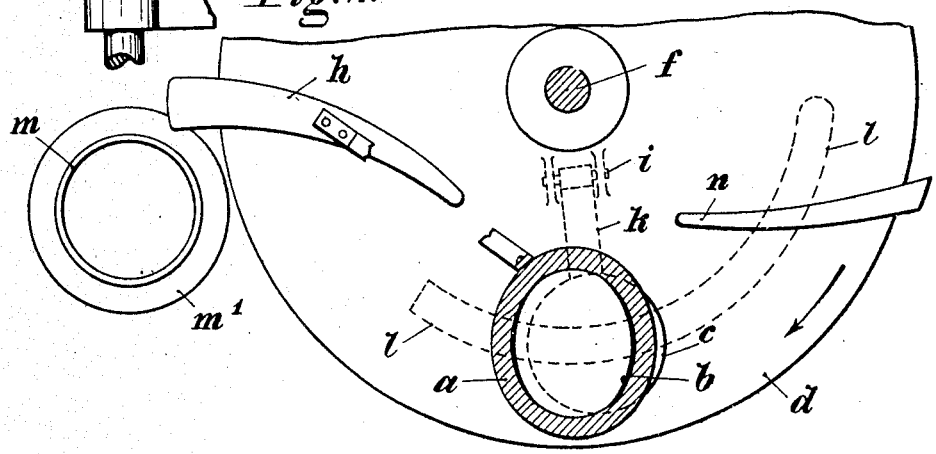
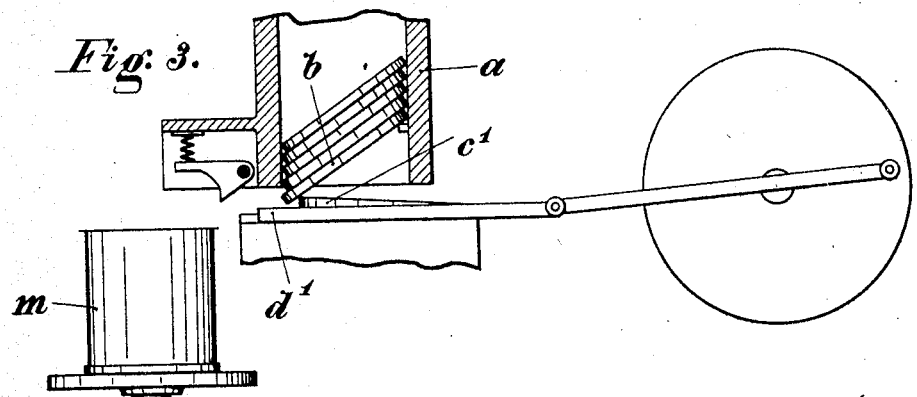
Witnesses:
Inventor
Otto Dempewolf
By
James L. Norris
Atty

ID:7497250741779

UNITED STATES PATENT OFFICE.

OTTO DEMPEWOLF, OF BRUNSWICK, GERMANY.

BLANK-FEED MECHANISM FOR CAN-CLOSING MACHINES.

No. 913,628.   Specification of Letters Patent.   Patented Feb. 23, 1909.

Application filed October 1, 1908. Serial No. 455,665.

*To all whom it may concern:*

Be it known that I, OTTO DEMPEWOLF, locksmith, a subject of the Emperor of Germany, residing at Brunswick, Duchy of Brunswick, Empire of Germany, have invented certain new and useful Improvements in Blank-Feed Mechanisms for Can-Closing Machines, of which the following is a specification.

This invention relates to improvements in blank feeding mechanisms, and more particularly to mechanisms for feeding can bottoms or lids to machines in which the latter are applied to can bodies, or to such machines in which a packing material is applied to the lids.

Though the feeding mechanism has been described with reference to a machine of the character indicated, it should be understood, that it may advantageously be used in machines of other character.

The object of the improvements is to provide a feeding mechanism, whereby the blank can be fed to the machine in a simple and reliable way, and which requires little space.

For the purpose of explaining the invention, an example embodying the same has been shown in the accompanying drawing, in which the same letters of references have been used in all the views to indicate corresponding parts.

In said drawing—Figure 1, is a side view, partly in section, of the feeding mechanism, showing in addition the part of the coöperating machine to which the blank is to be supplied, Fig. 2, is a plan of the parts shown in Fig. 1, and Fig. 3, is a side view of a modification of a detail of Figs. 1 and 2.

In the example illustrated in the drawing, a horizontal table $d$ is mounted on a vertical shaft $f$ rotatably mounted in a suitable bearing $o$. On the said table a plate or catch $c$ is provided which is adapted to be moved, by the rotation of the table $d$, below a vertical chute $a$ receiving the can bottoms or lids $b$. The chute $a$ is mounted in any suitable way on the frame of the machine. Within the same, the blanks $b$ are so arranged, that the catch or plate $c$, when moved below the chute $a$, engages in the hollow of the bottom or lid, so as to carry the same along in the direction of its travel. For this purpose, the lids or bottoms are piled up within the chute at an angle to the surface of the table $d$, and with their hollows directed toward the same. By the plate $c$ the blanks $b$ are securely guided towards the machine, though a guide way or the like is not provided. As shown in the drawing, the plate $c$ is yieldingly mounted on the table $d$, so that it can be moved out of the surface of the latter. And when thus moved out of the plane of the table $d$ it will permit the lid or bottom carried along thereby to be removed from the table $d$ by means of a guide bar $h$. In the example illustrated, the plate $c$ is secured to a lever $k$ rocking on a pivot $i$ secured to the lower face of the table $d$.

Opposite the chute $a$ a cam piece $l$ is provided, whereby the plate $c$ is moved upward slightly before it arrives below the chute $a$, and in time to take hold of the lowermost one of the blanks $b$. Before, however, the plate $c$ and the lid or bottom carried thereby, upon the forward travel of the table $d$, arrive in front of the guide bar $h$, the cam $l$ permits the lever $k$ to rock downward, so that the plate $c$ is shifted out of the plane of the table $d$. Now the lid or bottom can be moved by the bar $h$ away from the table $d$ and onto the machine, the receiving element of which, in the example illustrated, is a can body $m$ resting upon the well known lifting punch $m'$ of a can closing machine. At the rear of the plate $c$ a rib $n$ is preferably provided, which, in combination with the bar $h$, assures the feed of the blank away from the table $d$. The table $d$ may be rotated by any preferred means, such for example as toothed gears one of which is secured to the table. To secure a proper coöperation of the feeding mechanism with the machine the driving mechanism of the latter is operatively connected with that of the table $d$.

To hold the lids or bottoms $b$ piled up within the chute $a$ in their inclined positions in which they can be caught by the plate $c$, a lug $e$ or the like is provided within the chute, whereby the lowermost one of the lids $b$ is supported at one side, while it rests, with its opposite side, on the table $d$. A further means to hold the blanks in their inclined positions is shown in Fig. 2. In this example the horizontal cross-section of the chute $a$ is made elliptical or rectangular. One of the diameters of the ellipse, or one of the sides of the rectangle, is equal to the diameter of the lid, (or, in case of square lids, to the side of the same), while the other one is reduced, so that the lids $b$ must adjust themselves at a certain angle to the table $d$.

Instead of the rotary table $d$ other feeding means may be provided, such for instance as a reciprocating slide $d^1$ (Fig. 3) or the like, which upon its forward travel takes a blank along, while upon its backward travel it releases the blank, so as to discharge the same to the machine part $m$. In this case, the plate or catch $c^1$ is preferably made in the form of a wedge, as shown in Fig. 3.

I claim:

1. The combination with blank operating means and magazine means for holding a series of blanks, of blank feeding means comprising a rotatable table provided with a catch movable across the discharge end of the magazine means to engage and remove a blank therefrom, said catch being movable with respect to said table into or out of engagement with the blanks, means for operating the catch first to engage and remove a blank from said magazine means and subsequently to disengage the removed blank, and a stationary guide overlying the table and deflecting the disengaged blanks from the table to the blank operating means.

2. The combination with blank operating means and magazine means for holding a series of blanks of blank feeding means comprising a movable table provided with a catch arranged to travel across the discharge end of the magazine means and to engage and remove a blank therefrom and means for stripping the blank from the catch and for removing the blank from the table, said stripping means effecting the delivery of the blank to the blank operating means.

3. The combination with blank operating means and magazine means comprising a chute for holding a series of blanks, of a table provided with a catch movable across the discharge opening of the magazine means, said catch engaging and removing a blank from the magazine means in such movement, means for moving the catch with relation to the table and out of engagement with the blank and means for stripping the blank from the catch and for effecting the transfer of the stripped blank from the table to the blank operating means.

4. The combination with magazine means for holding a series of blanks, of a movable table, a catch mounted on the table and movable with respect to the plane of the table, said catch being arranged to travel across the discharge end of the magazine means, and means for moving the catch to engage a blank and to remove the same from the magazine means, said means having operation to release the catch whereby the latter disengages said blank at a point in the subsequent travel of said table.

5. The combination with magazine means for holding a series of blanks of a table, a catch movable across the discharge end of the magazine means, means for operating the catch to engage a blank and remove the same from the magazine means and to subsequently release the catch whereby the latter moves out of engagement with the blank, which is then supported on said table, and means for stripping the disengaged blanks from the table.

6. The combination with magazine means for holding a series of blanks, of a movable table, a catch pivotally mounted on the table and movable with respect to the latter, said catch being arranged to travel across the discharge end of the magazine means, and cam means for moving the catch to engage a blank and to remove the same from said magazine means and to subsequently release the catch whereby the latter moves out of engagement with the blank, which is then supported on the table.

7. The combination with magazine means for holding a series of blanks, of a movable table, a catch mounted upon and movable with respect to the table, said catch being arranged to travel across the discharge end of the magazine means, means for operating the catch to engage a blank and to remove the same from the magazine means and to subsequently release the blank, and means for stripping the released blank from the table.

8. The combination with magazine means for holding a series of blanks of a table having a catch movable across the discharge end of the magazine means and having operation to engage and remove a blank from said magazine means, and means for engaging the removed blank to strip the same from the table.

In testimony whereof I have hereunto set my hand in presence of two subscribing witnesses.

OTTO DEMPEWOLF.

Witnesses:
   JULIUS SECKEL,
   WILHELM LEHRKE.